United States Patent

Relvini et al.

[11] Patent Number: 6,100,355
[45] Date of Patent: *Aug. 8, 2000

[54] PROCESS FOR ACRYLIC SUSPENSION POLYMERIZATION WITH PARTIALLY HYDROSOLUBLE COMONOMERS

[75] Inventors: Pasquale Relvini; Fabio Giberti, both of Milan, Italy

[73] Assignee: Atohaas Holdings C.V., Netherlands

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/749,848

[22] Filed: Nov. 15, 1996

[30] Foreign Application Priority Data

Nov. 16, 1995 [IT] Italy .................. MI95A2357

[51] Int. Cl.[7] ...................................... C08F 2/20
[52] U.S. Cl. ............................................. 526/201
[58] Field of Search .................. 526/201, 72, 88

[56] References Cited

U.S. PATENT DOCUMENTS 5,344,901  9/1994  Relvini .
5,733,992  3/1998  Relvini .................................. 526/201

FOREIGN PATENT DOCUMENTS 457356  11/1991  European Pat. Off. .
683182  11/1995  European Pat. Off. .

OTHER PUBLICATIONS

European Search Report dated Jan. 23, 1997.

*Primary Examiner*—Christopher Henderson

[57] ABSTRACT

Process for the polymerization of acrylic monomers in aqueous suspension, wherein at least a comonomer has a solubility in water of at least 5 g per 100 g of water, to obtain copolymers containing the hydrosoluble comonomer up to 60% by weigh, in the presence of a radical initiator soluble in The monomer and of a polymeric suspending agent selected from the homopolymer of a compound of formula:

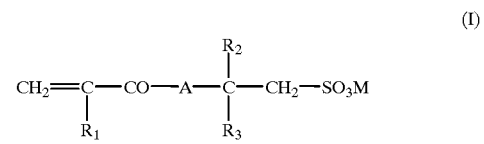

(I)

wherein: $R_1$ is H or $CH_3$; $R_2$ and $R_3$, equal or different, are H or alkyls $C_1$–$C_8$, optionally branched when possible; M is an alkaline or alkaline-earth metal or ammonium and A is NH, O or $NCH_3$, wherein the polymerization aqueous phase is wholly or partly formed by the mother waters obtained from a polymerization of an acrylic monomer, said mother waters containing an organic phase formed by the suspending agent and by other products formed during the polymerization, optionally supplemented with a further amount of said suspending agent so as to obtain an aqueous phase containing 0.01–1% by weight of suspending agent and 0.05–5% by weight of the products above mentioned formed during the polymerization.

6 Claims, No Drawings

PROCESS FOR ACRYLIC SUSPENSION POLYMERIZATION WITH PARTIALLY HYDROSOLUBLE COMONOMERS

FIELD OF THE INVENTION

The present invention relates to the manufacture of beads of acrylic (co)polymers, in particular to acrylic copolymers containing comonomers soluble in water as defined hereunder.

BACKGROUND OF THE INVENTION

It is known to polymerize acrylic monomers in suspension; by this process a system is carried out wherein an acrylic monomer is generally suspended under the form of drops in a continuous phase and polymerized by utilizing an initiator of radical type soluble in the monomer. The continuous phase is generally water. The ratio between continuous phase (water) and discontinuous phase (monomer) is generally comprised between 1:1 and 3:1. The final product is formed by a suspension of polymer particles (beads) with a diameter of 0.1–1 mm easily removable from water by centrifugation.

In the practical embodiment of this type of process, it is necessary the employment of suspending stabilizers hindering the coalescence of the small drops of monomer in the most advanced steps of the polymerization.

As suspending stabilizers hydrosoluble macromolecular compounds with affinity towards the monomer are used, which, placing themselves at the interface between organic phase and aqueous phase, form a protective film hindering agglomeration of the particles. At the end of the polymerization the suspending agent is removed from the surface of the polymer particles by washing with water.

The suspending agent is a key factor as its characteristics condition the performances of the whole process both from the point of view of the quality of the final product and from the point of view of manufacture costs, depending on the specific consumptions of raw materials, productivity, etc.

Various polymerization processes in aqueous suspension of acrylic monomers in general are known, among which the one described in European patent application 457,356, wherein particular polymers selected from the homopolymers of compounds of formula

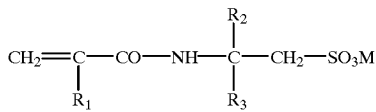

are used as suspending and stabilizing agents of the aqueous suspension, wherein: $R_1$=H, $CH_3$; $R_2$ and $R_3$, equal or different, are H, alkyls $C_1$–$C_8$, linear or branched when possible and M=alkaline or alkaline-earth metal, or copolymers of said compounds with acrylic monomers.

Tests carried out by the Applicant have shown that the polymerization process in suspension with the suspending agents indicated in the European patent application mentioned above in the water/monomers ratios comprised between 1:1 and 3:1 is unable to produce the copolymers object of the present invention.

The Applicant from experiments carried out has verified that when monomers soluble in water are copolymerized the stability of the suspension is compromised and agglomeration phenomena occur which can, in the most drastic cases, involve the whole polymeric mass and block the stirring and, in the less dramatic cases, produce formation of crusts and polymer blocks on the walls and on the buffles of the polymerization reactors. In any case these phenomena make the process not industrializable unless the reaction criticality is reduced by operating for instance with high water/monomer ratios and/or with rather slow polymerization kinetics. In any case the modifications above mentioned will damage the productivity.

Other organic or inorganic suspending agents are well known in the art, for instance polyvinylic alcohol, hydroxyalkylcellulose, etc.; among the inorganic ones for instance tricalcic phosphate in combination with the so called extenders (surfactants).

However the drawback of these suspending agents resides in that the polymers obtained show optical properties not suitable to the typical fields of the acrylic products for instance, lighting, car lights, signes, etc.

Polymerizations in suspension in non aqueous mediums (solvents) are also known, however there are here drawbacks due to the higher costs of solvent and polymer recovery and safety problems due to inflammability and explosiveness of solvents.

Other systems known in the art to produce the copolymers of the invention can be in solution: the acrylic monomers are dissolved in a suitable solvent and then polymerized by radical way. The copolymers of the invention can be produced with this method, however there is the drawback of the removal of the solvent from the polymer as said above.

Alternative processes to those in solution are those in mass, wherein the solvent is the monomer itself.

Both these processes, in solution and in mass are generally utilized in continuous from the industrial point of view to obtain higher productivities, the volumes of equipments utilized being the same, compared with a semicontinuous process. The drawback of continuous processes resides in that they result not very flexible from the industrial point of view.

Generally, the manufacture volumes of copolymers with hydrosoluble comonomers up till now do not justify a continuous dedicated plant. In this case a continuous process would require frequent campaign changes with big recovery problems of the unreacted monomers and of the polymer produced during the campaign transition.

The copolymers of the invention can be produced also in emulsion, however there are higher plant and processing costs owing to the separation of the emulsion. Besides the obtained copolymer results optically less pure for the presence of surfactants and/or coagulants.

It was felt the need to have at one's disposal an industrial process allowing to produce copolymers containing the comonomers soluble in water with high yields combined with good mechanical and optical properties typical so the high quality acrylic products and obtained with multipurpose (discontinuous) plants.

It has now been unexpectedly and surprisingly found that this is possible by using the process described hereunder.

DESCRIPTION OF THE INVENTION

Object of the present invention is therefore a process for the polymerization of acrylic monomers in aqueous suspension wherein at least a comonomer has a solubility in water of at least 5 g per 100 g of water, to obtain copolymers containing the comonomer hydrosoluble up to 50% by weight, preferably from 0.5 to 40%, more preferably 2–20%, in the presence of a radical initiator soluble in the monomer and of a polymeric suspending agent selected from:

a) the homopolymers of a compound of formula:

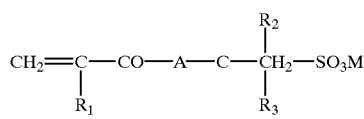

(I)

wherein: $R_1$ is H or $CH_3$; $R_2$ and $R_3$, equal or different, are H or alkyls $C_{1-C8}$, optionally branched when possible; M is an alkaline or alkaline-earth metal or ammonium and A is NH, O or $NCH_3$, b) the copolymers of said compound of formula I with at most 40% by weight of acrylic monomers, characterized in that the polymerization aqueous phase is wholly or partly formed by the mother waters obtained from a polymerization of an acrylic monomer, even different from that utilized for the polymer meant to be produced, and also not containing an hydrosoluble comonomer, after the separation of the beads, said mother waters containing an organic phase formed by the suspending agent and other products obtained during the polymerization, optionally charged with a further amount of said suspending agent, so as to obtain an aqueous phase containing 0.01–1% by weight of suspending agent and 0.05–5% by weight, preferably 0.05–1.5%, of the above mentioned products formed during the polymerization.

Preferably the suspending agent is in concentration from 0.03 to 0.3%.

The process according to the invention can be carried out with the known modalities for polymerizations in aqueous suspension, i.e. operating with ratios between the aqueous phase and the monomers generally comprised between 1:1 and 3:1, preferably 1.5:1 and 2.5:1, in the presence of a molecular weight regulator and a radical polymerization initiator, both soluble in the monomer.

The reaction temperatures are those at which the decomposition of the initiators occurs, generally comprised from 50° C. to 120° C.

The aqueous phase is formed from 10%, to 100%, preferably 30–100° C., by weight by the mother waters obtained by a previous polymerization, provided that the minimum concentrations of said suspending agent and of said "other products" obtained during the polymerization are respected.

The mother waters do not need to come from a polymerization with the same composition of the monomeric phase object of the invention as said above.

Such mother waters after the separation of the acrylic polymer, for instance by centrifugation or filtering, generally contain, in relation to the reaction conditions used, from 0.3% to 3% by weight of organic phase, (those indicated above as other products), determined as dry residue at 160° C. It is possible to recycle from 10 to 100% of said mother waters, optionally by supplementing if necessary with further amounts of water containing fresh suspending agent.

The monomeric mixture which can be polymerized according to the process of the present invention is formed by:

a1) one or more $C_1$–$C_8$ alkylacrylates or methacrylates, linear or branched when possible such as, for instance, methyl(meth)acrylate, ethyl(meth)acrylate, propyl (meth) acrylate, isopropyl (meth)acrylate, butylacrylate, sec-butyl (meth)acrylate, ter-butyl (meth) acrylate;

b1) one or more monomers soluble in water having solubility in water of at least 5 g per 100 of water at T of 23° C., in amounts generally of 60% by weight at most, preferably 500 such as, for instance, acrylic, methacrylic acid, acrylamide, hydroxyethyl(meth) acrylate, hydroxypropyl(meth)acrylate;

c1) optionally another monomer in amount at 50% by weight at most, such as, for instance, styrene, alpha-methylstyrene, meth)acrylonitrile, n-alkyl or aryl-maleimides with the alkyl from 1 to 10 carbon atoms and the aryl from 6 to 12 carbon atoms, butadiene, styrene sulphonic, N-vinylpyrrolidone.

As radical initiators, peroxides, such as for instance, t-butylperoxy-2-ethylhexanoate, dibenzoylperoxide, t-butylperoxydiethylacetate or unstable azocompounds such as, for instance, azodiisobutyronitrile, can be employed.

As chain transfer agents can be employed alkyl thiols with the alkyl linear or branched by $C_{3-C20}$, preferably $C_{4-C12}$, such as, for instance, n-butanthiol, n-octanthiol, n-dodecanthiol, ter-dodecanthiol, cyclohexanthiol, pinanthiol.

The stabilizing agents utilized in the process of the present invention, are prepared by homopolymerization of the compounds of formula (I) or by copolymerization of said compounds of formula (I) with acrylic monomers in aqueous solution according to what described in EP patent 457.356 herein incorporated by reference.

In particular the compounds of formula (I) can be, for instance, 2-acrylamido-2-methylpropansulphonate of sodium, 2-methacrylamido-2-methylpropansulphonate of sodium, 2-acrylamido-propansulphonate of sodium, 2-acrylamido-2-ethansulphonate of sodium.

Compounds of formula I wherein $R_2$ and $R_3$ are alkyl, $C_{1-C8}$, also branched when possible, are preferred.

Acrylic monomers which can be copolymerized with the compounds of formula (I) can be, for instance, (meth) acrylamide, alkaline or alkaline-earth salts of the (meth) acrylic acid, esters of the (meth)acrylic acid with an aliphatic alcohol $C_{1-C4}$, acrylonitrile.

With the process of the present invention it is therefore possible to industrially prepare beads of the composition indicated above, i.e. containing up to 60% of a monomer soluble in water, preferably a monomer of acrylic type, operating with water/monomer ratios even near 1 and with polymerization kinetics of about 2 hours with the following advantages:

Optimal stability of the suspension, without therefore the appearance of undesired phenomena of agglomeration of the polymer or fouling of the reactor walls;

drastic reduction of the processing waters to be removed drastic reduction of the specific consumption of suspending agent without, however, modifying the good mechanical and optical properties of the polymers so obtained.

EXAMPLES

Illustrative examples of the invention are given but without limiting the same.

EXAMPLE 1

Preparation of the Suspending Agent 120 parts of a 40k by weight NaOH solution and 630 parts of deionized water are loaded in a reactor. 250 parts of 2-acrylamido-2-methylpropansulphonic acid (AMPS) are slowly fed, then the pH is adjusted in the range 7–8 with small amounts of soda or of AMPS. After the solution has been fluxed with nitrogen to eliminate oxygen and heated at 500° C., 0.075 parts of potassium persulphate and 0.025 parts of sodium methabisulphite are added. Polymerization ends in about 60 minutes. Then it is diluted with 4000 parts of deionized water obtaining a solution with a dry residue at 160° C. of 5.5% by weight and a Brookfield viscosity of 4 Pa's, measureed at 25° C.

EXAMPLE 2 (comparative)
Preparation of a Methylmethacrylate Copolymer—Methacrylic Acid Polymerization in suspension of the methyl-methacrylate and of the methacrylic acid is carried out by utilizing as suspending agent the homopolymer of the sodic salt of 2-acrylamido-2-methylpropansulphonic acid obtained in Example 1.

193 parts of deionized water and 7 parts of the solution obtained in Example 1, corresponding to 0.385 parts of dry product are placed in a stirred, jacketed and pressure-resisting reactor. Oxygen is eliminated by means of nitrogen flow and the solution is heated to 80° C. 100 parts of a mixture, deoxigenated too, formed by: methylmethacrylate 90 parts, methacrylic acid 8 parts, methylacrylate 2 parts, t-butylperoxy-2-ethylhexanoate 0.25 parts, n-butanthiol 0.19 parts, are then fed. The reactor is hermetically sealed, Pressurized at 100 KPa and under continuous stirring the mixture is gradually heated up to 110° C. in 120 min. An unstable suspension is obtained, with partial reactor block, the obtained polymer is not utilizable.

The reactor is cleared by mechanical removal of the block and subsequent washing with solvent.

EXAMPLE 3 (comparative)
Mother Waters Preparation

The polymerization in suspension of methylmethacrylate and of ethylacrylate is carried out, by using as suspending agent the homopolymer of the sodic salt of 2-acrylamide-2-methylpropansulphonic acid obtained in example 1.

193 parts of deionized water and 7 parts of the solution obtained in Example 1, corresponding to 0.385 parts of dry product are placed in a stirred, jacketed and pressure-resisting reactor. Oxygen is eliminated by means of nitrogen flow and the solution is heated at 80° C. There are then fed: methylmethacrylate 98 parts, methylacrylate 2 parts, t-butylperoxy-2-ethylhexanoate 0.25 parts, n-butanthiol 0.19 parts. The reactor is hermetically sealed, pressurized at 100 KPa and under continuous stirring the mixture is gradually heated up to 110° C. in 120 min. The reactor is let stay at 110° C. for 15 min, then it is cooled. The polymer, under form of beads, is removed from the mother waters by centrifugation, washed with deionized water and dried in stove at 80° C. The polymer is riddled on a 500 μm sieve and the retained fraction is lower than 0.5%.

The beads are transformed by extrusion into granules for injection molding. The features of the so obtained granules have been reported in Table 2. The mother waters, with a dry residue at 160° C. of about 0.62% by weight, partly formed by the suspending agent (0.2% by weight) and for the remaining fraction by other products obtained during the polymerization, are gathered to be reutilized in the successive polymerization tests. The polymerization reactor, after the test outlet and washing with water jet, appears clean and is therefore suitable for a subsequent polymerization.

EXAMPLE 4
Preparation of a Methylmethacrylate Copolymer—Methacrylic Acid

In the same reactor already utilized in example 2, and with the general operating modalities described in said example, the polymerization is carried out in suspension of the methylmethacrylate and of the methacrylic acid by utilizing as suspending agent a fraction of the mother waters coming from the polymerization described in example 3. 200 parts of mother waters of example 3 are then loaded into the reactor. The solution is heated to 80° C. and then methylmethacrylate 90 parts, methacrylic acid 8 parts, methylacrylate 2 parts, t-butylperoxy-2-ethylhexanoate 0.25 parts, n-butanthiol 0.19 parts, are then fed. The polymerization is carried out according to the modalities already described in example 2. At the end of the polymerization the reactor is let stay at 110° C. for 15 minutes, then it is cooled. The polymer, under form of beads, is removed from the mother waters by centrifugation, washed with deionized water and dried in stove at 80° C. The polymer is riddled on a 500 micron sieve and the retained fraction is lower than 0.5%.

The beads are transformed by extrusion into granules for injection molding. The features of the so obtained granules have been reported in Table 2. The polymerization reactor, after the test outlet and washing with water jet, appears clean and is therefore suitable for a subsequent polymerization.

EXAMPLES 5–11

The subsequent examples from 5 to 11 are Carried out with the same operating modalities of example 4, in the same polymerization reactor employing the same composition of the aqueous chase.

The composition of the monomeric phase is reported in Table 1, the properties of the obtained polymers are reported in table 2.

The polymerization reactor, after the outlet of each raw test and washing with water jet, appears clean and is therefore suitable for a subsequent polymerization.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1

| Example | Aqueous phase (parts) | MMA (parts) | Methacrylic acid (parts) | Styrene (parts) | Acrylic acid (parts) | Acrylamide (parts) | Initiator (*) (parts) | Regulator (**) (parts) |
| --- | --- | --- | --- | --- | --- | --- | --- | --- |
| 5 | 200 | 60 | 40 | | | | 0.25 | 0.19 |
| 6 | 200 | 80 | 20 | | | | 0.25 | 0.19 |
| 7 | 200 | 84 | 8 | 8 | | | 0.25 | 0.23 |
| 8 | 200 | 72 | 8 | | 20 | | 0.25 | 0.19 |
| 9 | 200 | 52 | 8 | | 40 | | 0.25 | 0.19 |

TABLE 1-continued

| Example | Aqueous phase (parts) | MMA (parts) | Methacrylic acid (parts) | Styrene (parts) | Acrylic acid (parts) | Acrylamide (parts) | Initiator (*) (parts) | Regulator (**) (parts) |
|---|---|---|---|---|---|---|---|---|
| 10 | 200 | 90 | | | 10 | | 0.25 | 0.19 |
| 11 | 200 | 90 | | | | 10 | 0.25 | 0.19 |

(*) 2 butyl peroxy-2-ethylhexanoate
(**) n-butanthiol

TABLE 2

| Example | Yellow Index (*) | Haze () | Light transmission (*) | Intrinsic viscosity (****) cc/g | MFR (□) g | Vicat 49N (□*) °C. |
|---|---|---|---|---|---|---|
| 2 | (□) | (□) | (□) | (□) | (□) | (□) |
| 3 | 2.1 | 0.50 | 92 | 48 | 3.0 | 108 |
| 4 | 3.2 | 0.50 | 92 | 50 | 1.1 | 117 |
| 5 | 6.0 | 0.50 | 92 | 60 | 0.2 | 145 |
| 6 | 4.3 | 0.50 | 92 | 55 | 0.6 | 135 |
| 7 | 3.7 | 0.53 | 92 | 40 | 3.9 | 119 |
| 8 | 4.2 | 0.60 | 91 | 50 | 1.7 | 117 |
| 9 | 6.1 | 0.70 | 91 | 62 | 3.5 | 111 |
| 10 | 4.0 | 0.50 | 92 | 50 | 3.0 | 116 |
| 11 | 4.5 | 0.55 | 92 | 50 | 3.0 | 110 |

(*) ASTM D1925-70 standard
(**) Test thickness 3 mm, ASTM D 1003-61 standard
(***) (400–900 nm), tests thickness 3 mm, ASTM D1003-61 standard
(****) ISO 1628-116 standard
(□) 230° C., 3.8 Kg, ISO 1133 standard
(□*) ISO 306 standard
(□**) Beads have not been produced (blocked reactor)

What is claimed is:

1. Process for the polymerization of acrylic monomers in aqueous suspension, comprising at least a comonomer having a solubility in water of at least 5 g per 100 g of water, to obtain copolymers containing the comonomer hydrosoluble up to 60% by weight, in the presence of a radical initiator soluble in the monomer and of a polymeric suspending agent selected from:

a) the homopolymers of a compound of formula:

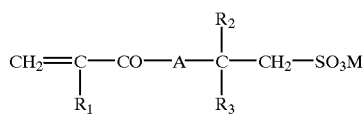

wherein: $R_1$ is H or $CH_3$; $R_2$ and $R_3$, are the same or different, and are H or alkyls $C_1$–$C_8$, and are optionally branched; M is an alkaline or alkaline-earth metal or ammonium; and A is NH, O or $NCH_3$; and b) the copolymers of said compound of formula I with 40% by weight at most of acrylic monomers, the polymerization aqueous phase is formed from 30 to 100% by weight by the mother waters obtained from a polymerization of an acrylic monomer, optionally different from that utilized for the polymer intended to be produced, and also not containing an hydrosoluble comonomer, after the separation of the beads, said mother waters containing an organic phase formed by the suspending agent and other products obtained during the polymerization, optionally charged with a further amount of said suspending agent, to obtain an aqueous phase containing 0.01–1% by weight of suspending agent and 0.05–5% by weight of polymerization products.

2. Process for the polymerization of acrylic monomers in aqueous suspension wherein at least a comonomer is soluble in water according to claim 1 wherein the aqueous phase contains from 0.05–1.5% by weight of the above mentioned other products obtained during the polymerization and the suspending agent in concentration from 0.03 to 0.3% by weight.

3. Process for the polymerization in aqueous suspension of acrylic monomers wherein at least a comonomer is soluble in water according to claim 1 wherein the ratio between water and monomers is between 1.5:1 and 2.5:1.

4. Process for the polymerization in aqueous suspension of acrylic monomers wherein at least a comonomer is soluble in water according to claim 1 wherein the monomeric mixture is formed by:

a1) at least one $C_1$–$C_8$ alkylacrylate or methacrylate linear or branched optionally including methyl(meth)acrylate, ethyl(meth)acrylate, propyl(meth)acrylate, isopropyl (meth)acrylate, butylacrylate, sec-butyl(meth)acrylate, terbutyl(meth)acrylate;

b1) at least one monomer soluble in water having solubility in water of at least 5 g per 100 g of water at temperature of 23° C., in amounts of 60% by weight at most, including acrylic, methacrylic acid, acrylamide, hydroxyethyl(meth)acrylate, hydroxypropyl(meth) acrylate;

c1) optionally another monomer in amount at 50% by weight at most, including styrene, alphamethyl-styrene, (meth)acrylonitrile, n-alkyl or arylmaleimides with the alkyl from 1 to 10 carbon atoms and the aryl from 6 to 12 carbon atoms, butadiene, styrene sulphonic, N-vinylpyrrolidone.

5. Process for the polymerization in aqueous suspension of acrylic monomers wherein at least a comonomer is soluble in water according to claim 1 wherein the suspending agent of formula (I) is selected from: sodium 2-acrylamido-2-methylpropansulphonate, sodium 2-methacrylamido-2-methylpropansulphonate, sodium 2-acrylamidopropansulphonate, sodium 2-acrylamido-2-ethansulphonate.

6. The process according to claim 4, wherein the monomer is an amount of 50% by weight.

* * * * *